United States Patent
Chiu et al.

(10) Patent No.: US 7,724,959 B2
(45) Date of Patent: *May 25, 2010

(54) DETERMINING REGIONS OF INTEREST IN PHOTOGRAPHS AND IMAGES

(75) Inventors: Patrick Chiu, Menlo Park, CA (US); Qiong Liu, Milpitas, CA (US); Andreas Girgensohn, Menlo Park, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1236 days.

This patent is subject to a terminal disclaimer.

(21) Appl. No.: 10/948,730

(22) Filed: Sep. 23, 2004

(65) Prior Publication Data

US 2006/0062455 A1    Mar. 23, 2006

(51) Int. Cl.
*G06K 9/46* (2006.01)
(52) U.S. Cl. ...................................... 382/190
(58) Field of Classification Search ........................ None
See application file for complete search history.

(56) References Cited

U.S. PATENT DOCUMENTS

| | | | |
|---|---|---|---|
| 5,048,109 A | | 9/1991 | Bloomberg |
| 5,341,439 A | * | 8/1994 | Hsu ........................... 382/103 |
| 5,537,491 A | | 7/1996 | Mahoney |
| 5,553,207 A | | 9/1996 | Sekiguchi |
| 5,751,844 A | * | 5/1998 | Bolin et al. .................. 382/156 |
| 6,026,143 A | | 2/2000 | Simanovsky |
| 6,081,615 A | | 6/2000 | Yasui |
| 6,222,932 B1 | | 4/2001 | Rao |
| 6,275,614 B1 | | 8/2001 | Krishnamurthy |
| 6,292,575 B1 | * | 9/2001 | Bortolussi et al. ........... 382/118 |
| 6,415,046 B1 | * | 7/2002 | Kerut, Sr. .................... 382/128 |
| 6,470,095 B2 | | 10/2002 | Mahoney |
| 6,542,637 B1 | * | 4/2003 | Kita ........................... 382/195 |
| 6,562,077 B2 | | 5/2003 | Bobrow |
| 6,584,221 B1 | * | 6/2003 | Moghaddam et al. ....... 382/165 |
| 6,683,992 B2 | * | 1/2004 | Takahashi et al. ........... 382/243 |
| 6,731,789 B1 | | 5/2004 | Tojo |
| 6,819,793 B1 | | 11/2004 | Reshetov |

(Continued)

OTHER PUBLICATIONS

Chiu, P., Girgensohn, A., Polak, Wolf, Rieffel, E., Wilcox, L., Bennett III, F., A Genetic Segmentation Algorithm for Image Data Streams and Video, Proceedings of the Genetic and Evolutionary Computation Conference (GECCO), Las Vegas, NV, 2000.

(Continued)

*Primary Examiner*—Vikkram Bali
*Assistant Examiner*—Elisa M Rice
(74) *Attorney, Agent, or Firm*—Fliesler Meyer LLP

(57) ABSTRACT

An algorithm for finding regions of interest (ROI) in images and photos based on an information driven approach in which sub-blocks of an image are analyzed for information content or compressibility based on the discrete cosine transform. The sub-blocks of low compressibility are grouped into ROIs using a morphological technique. Unlike other algorithms that are geared for highly specific types of ROI (e.g. face detection), the method of the present invention is generally applicable to arbitrary images and photos. A center-weighted variation of the algorithm can produce better results for certain photo applications. The algorithm can be used with several other image applications, including Stained-Glass collages and Pan-and-Scan presentations.

26 Claims, 10 Drawing Sheets

U.S. PATENT DOCUMENTS

| | | | |
|---|---|---|---|
| 6,819,795 | B1 | 11/2004 | Chiu et al. |
| 6,922,485 | B2 | 7/2005 | Hirata |
| 6,965,706 | B2 | 11/2005 | Qian |
| 7,043,094 | B2 | 5/2006 | Thomas |
| 7,110,007 | B2 | 9/2006 | Odagawa |
| 7,239,743 | B2 | 7/2007 | Gardella |
| 7,263,220 | B2 * | 8/2007 | Crandall et al. ............ 382/165 |
| 7,295,700 | B2 | 11/2007 | Schiller |
| 7,383,509 | B2 | 6/2008 | Foote |
| 2001/0020981 | A1 | 9/2001 | Jun |
| 2002/0031247 | A1 | 3/2002 | Matsuura |
| 2002/0044696 | A1 * | 4/2002 | Sirohey et al. ............ 382/240 |
| 2002/0076100 | A1 | 6/2002 | Luo |
| 2003/0044061 | A1 | 3/2003 | Prempraneerach |
| 2003/0053686 | A1 | 3/2003 | Luo |
| 2003/0099397 | A1 * | 5/2003 | Matsugu et al. ............ 382/173 |
| 2003/0108238 | A1 | 6/2003 | Xu |
| 2006/0126932 | A1 | 6/2006 | Eschbach |

OTHER PUBLICATIONS

Boreczky, John, et al., "An Interactive Comic Book Presentation for Exploring Video," *Proc. Chi '00*, ACM Press, pp. 185-192 (2000).

Cai, Deng, et al., "Hierarchical Clustering of WWW Image Search Results Using Visual, Textual and Link Information," *Proc. Of ACM Multimedia '04*, pp. 952-959 (2004).

Chen, Francine, et al., "Multi-Modal Browsing of Images in Web Documents," *Proc. Of SPIE Document Recognition and Retrieval VI* (1999).

Chiu, Patrick, et al., "Stained-Glass Visualization for Highly Condensed Video Summaries," *Proc. IEEE Intl. Conf. On Multimedia and Expo* (*ICME '04*) (2004).

Girgensohn, Andreas, et al., "Stained Glass Photo Collages," *UIST '04 Poster*, pp. 13-14 (2004).

Ide, Nancy, et al., "Word Sense Disambiguation: the State of the Art," *Computational Linguistics*, 24(1), pp. 1-40, 1998.

Kerne, Andruid, "*CollageMachine: a Model of 'Interface Ecology*,'" NYU Ph.D. Dissertation (2001).

Li, Zhi-Wei, et al., "Intuitive and Effective Interfaces for WWW Image Search Engines", *ACM Multimedia '04 Demo*, 2004.

Ma, Yu-Fei, et al., "Contrast-based Image Attention Analysis by Using Fuzzy Growing," *Proc. Of ACM Multimedia '03*, pp. 374-381.

Mukherjea, Sougata, et al., "Using Clustering and Visualization for Refining the Results of a WWW Image Search Engine", *Proc. 1998 Workshop on New paradigms in Information Visualization and Manipulation, ACM Press*, pp. 29-35 (1998).

Suh, Bongwon, et al., "Automatic Thumbnail Cropping and Its Effectiveness," *Proceedings of UIST '03*, pp. 95-104 (2003).

Wang, Xin-Jing, et al., "Multi-Model Similarity Propagation and Its Application for Web Image Retrieval," *Proc. Of ACM Multimedia '04*, pp. 944-951 (2004).

Wang, Xin-Jing, et al., "Grouping Web Image Search Result," *ACM Multimedia '04 Poster* (Oct. 10-16, 2004), pp. 436-439 (2004).

Wang, Ming-Yu, et al., "MobiPicture - Browsing Pictures on Mobile Devices," *ACM Multimedia '04 Demo* (Nov. 2-8, 2003), pp. 106-107 (2003).

Christel, M., et al., "Multimedia Abstractions for a Digital Video Library," Proceedings of ACM Digital Libraries '97 International Conference, pp. 21-29, Jul. 1997.

Elliott, E.L., "Watch-Grab-Arrange-See: Thinking with Motion Images via Streams and Collages," MIT MS Visual Studies Thesis, Feb. 1993.

Peyrard, N., et al., "Motion-Based Selection of Relevant Video Segments for Video Summarisation," Proc. Intl. Conf. On Multimedia and Expo (ICME 2003), 2003.

Uchihashi, S., et al., "Video Manga: Generating semantically meaningful video summaries," Proceedings ACM Multimedia '99, pp. 383-392, 1999.

Yeung, M., et al., "Video Visualization for Compact Presentation and Fast Browsing of Pictorial Content," IEEE Transactions on Circuits and Systems for Video Technology, vol. 7, No. 5, pp. 771-785, Oct. 1997.

\* cited by examiner

DETERMINING REGIONS OF INTEREST IN PHOTOGRAPHS AND IMAGES

CROSS REFERENCE TO RELATED APPLICATIONS

The present application is related to the following United States Patents and Patent Applications, which patents/applications are assigned to the owner of the present invention, and which patents/applications are incorporated by reference herein in their entirety:

U.S. patent application Ser. No. 10/948,823, entitled "DETERMINING REGIONS OF INTEREST IN SYNTHETIC IMAGES", filed on Sep. 23, 2004, U.S. patent application Ser. No. 10/815,389, entitled "EXTRACTING VIDEO REGIONS OF INTEREST", filed on Mar. 31, 2004, currently pending; and U.S. patent application Ser. No. 10/815,354, entitled "GENERATING A HIGHLY CONDENSED VISUAL SUMMARY", filed on Mar. 31, 2001, currently pending.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The current invention relates generally to digital image processing, and more particularly to finding regions of interest in natural and synthetic images.

2. Description of the Related Art

A tremendous amount of digital images and photos are being created with the ubiquitous digital cameras, camera cell phones and PDAs. An important challenge is figuring out ways to manage and visualize collections of images and photos. In the case of photos, small sets from events such as social gatherings and travels are especially prevalent. Another factor is viewing images on small displays and mobile devices, when it is helpful to provide ways to condense the images.

In U.S. patent application Ser. No. 10/815,389, entitled "EXTRACTING VIDEO REGIONS OF INTEREST" and U.S. patent application Ser. No. 10/815,354, entitled "GENERATING A HIGHLY CONDENSED VISUAL SUMMARY", a method was disclosed to summarize and condense a video using a Stained-Glass Visualization, which shows a video using a storyboard generated from regions of interest (ROI) in the key frames of the highly ranked video segments. The ROIs are laid out and the gaps are filled by extending the ROIs using a Voronoi technique. This produces irregular boundaries and the result looks like a stained glass. Along with the visualization method, an algorithm was provided for finding the ROIs in a video segment based on motion analysis.

The Stained-Glass visualization is applicable to photos and images, producing a collage from a given set of images. Photo collages can be used in many ways. For example, a wallet-sized collage of family members can be displayed on a PDA or cell phone. Larger collages of a party can be put on a Web page and shared with friends. Poster sized collages of scenic photos from a vacation can be printed and framed.

Our earlier algorithm for finding ROIs in videos, being based on motion analysis, does not work for still images. What is needed is a method for finding ROIs in images and photos such that collections of images and photos can be managed and visualized and presented on large and small displays.

SUMMARY OF THE INVENTION

In one embodiment, the present invention has been made in view of the above circumstances and includes an algorithm for finding regions of interest (ROI) in images and photos based on an information driven approach in which sub-blocks of an image are analyzed for information content or compressibility based on the discrete cosine transform. The sub-blocks of low compressibility are grouped into ROIs using a morphological technique. Unlike other algorithms that are geared for highly specific types of ROI (e.g. face detection), the method of the present invention is generally applicable to arbitrary images and photos. A center-weighted variation of the algorithm can produce better results for certain photo applications. The present invention can be used with several other image applications, including Stained-Glass collages and Pan-and-Scan presentations.

BRIEF DESCRIPTION OF THE DRAWINGS

Preferred embodiment(s) of the present invention will be described in detail based on the following figures, wherein.

DETAILED DESCRIPTION OF THE INVENTION

In one embodiment, the present invention includes an algorithm for finding regions of interest (ROI) in images and photos based on an information driven approach in which sub-blocks of an image are analyzed for information content or compressibility based on the discrete cosine transform. The sub-blocks of low compressibility are grouped into ROIs using a morphological technique. Unlike other algorithms that are geared for highly specific types of ROI (e.g. face detection), the method of the present invention is generally applicable to arbitrary images and photos. A center-weighted variation of the algorithm can produce better results for certain photo applications. The present invention can be used with several other image applications, including Stained-Glass collages and Pan-and-Scan presentations.

Figure 1:
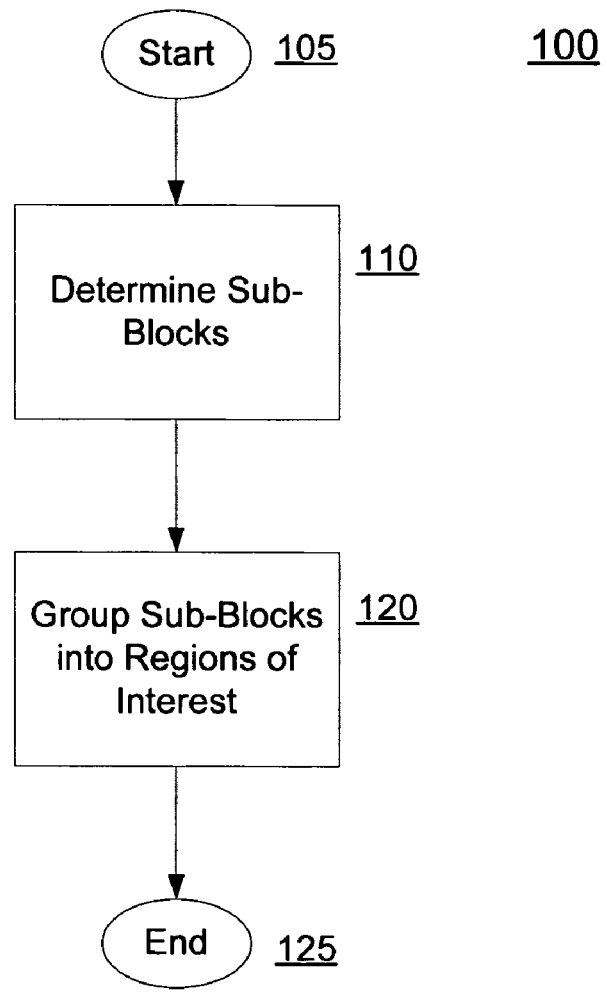
FIG. 1 is an illustration of a method for determining regions of interest in photos and images in accordance with one embodiment of the present invention.

FIG. 1 is an illustration of a method 100 for finding regions of interest in images and photos in accordance with one embodiment of the present invention. Method 100 begins with start step 105. Sub-blocks within an image are then determined at step 110. After the sub-blocks within an image are determined, the sub-blocks are grouped into ROIs at step 120. These steps are discussed in more detail below. Operation of method 100 then ends at step 125.

Determining Sub-Blocks in an Image

Figure 2:
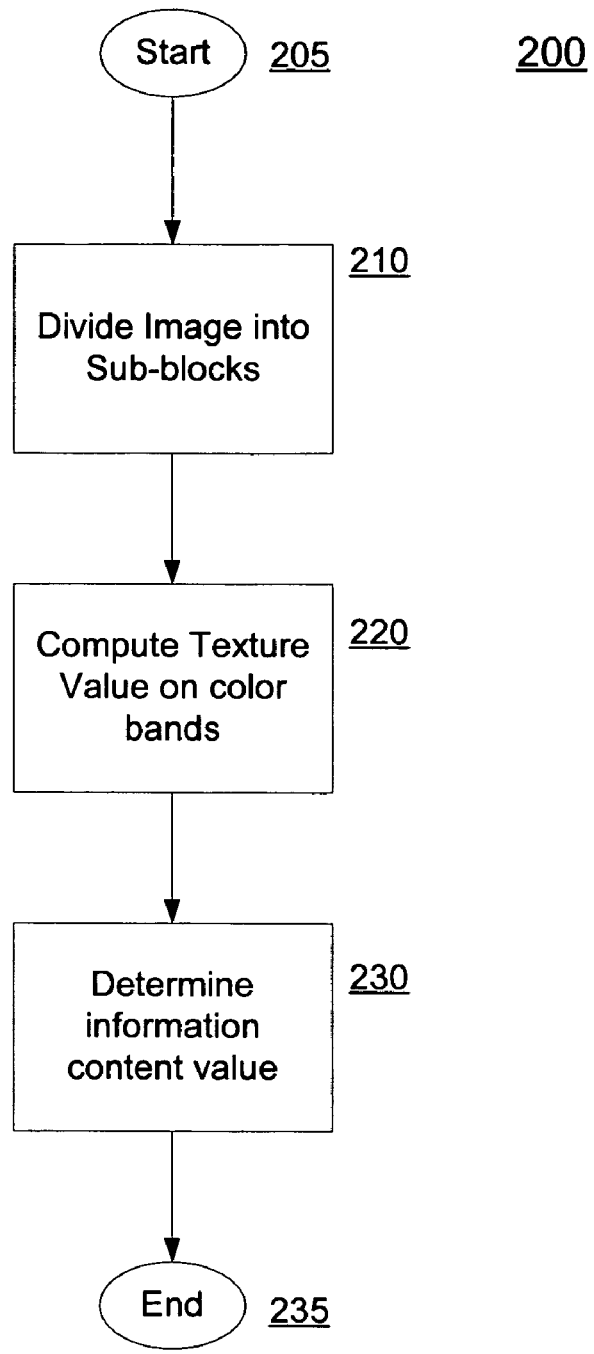
FIG. 2 is an illustration of a method for determining sub-blocks in an image in accordance with one embodiment of the present invention.

In one embodiment, determining sub-blocks of an image involves determining sub-blocks having high information content. FIG. 2 is an illustration of a method 200 for finding sub-blocks of high information in accordance with one embodiment of the present invention. Method 200 begins with start step 205. Next, the image is divided into sub-blocks at step 210. The actual size of the sub-blocks may vary according to the processing power of the system and the desired detail of the results. In another embodiment, the original size of an image may be scaled to a desired size from which sub-blocks can be taken. For example, images may scaled to 128×128 pixels, from which sixty-four sub-blocks of 16×16 can be partitioned.

Figure 3A:
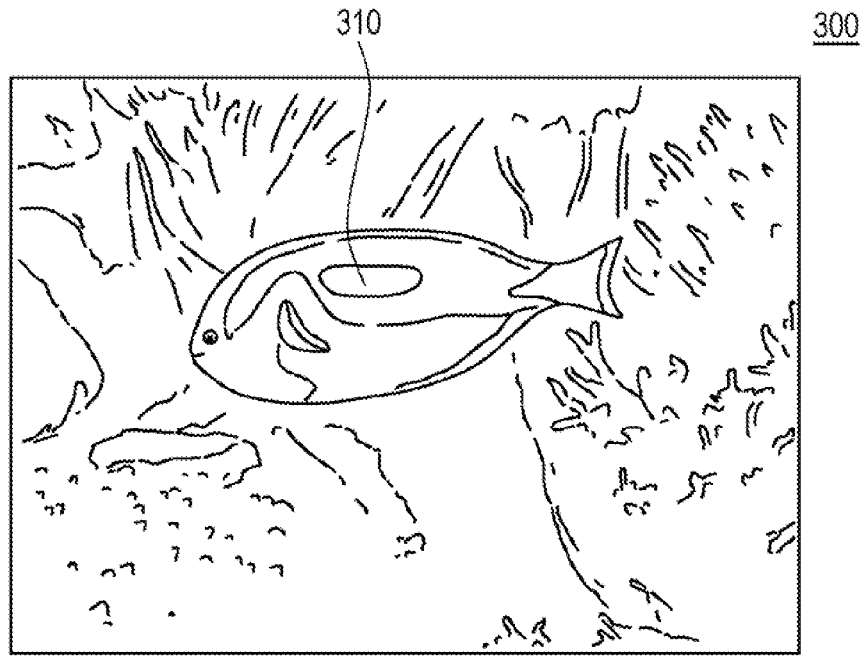
FIG. 3A is an illustration of an image having multiple color bands in accordance with one embodiment of the present invention.
Figure 3B:
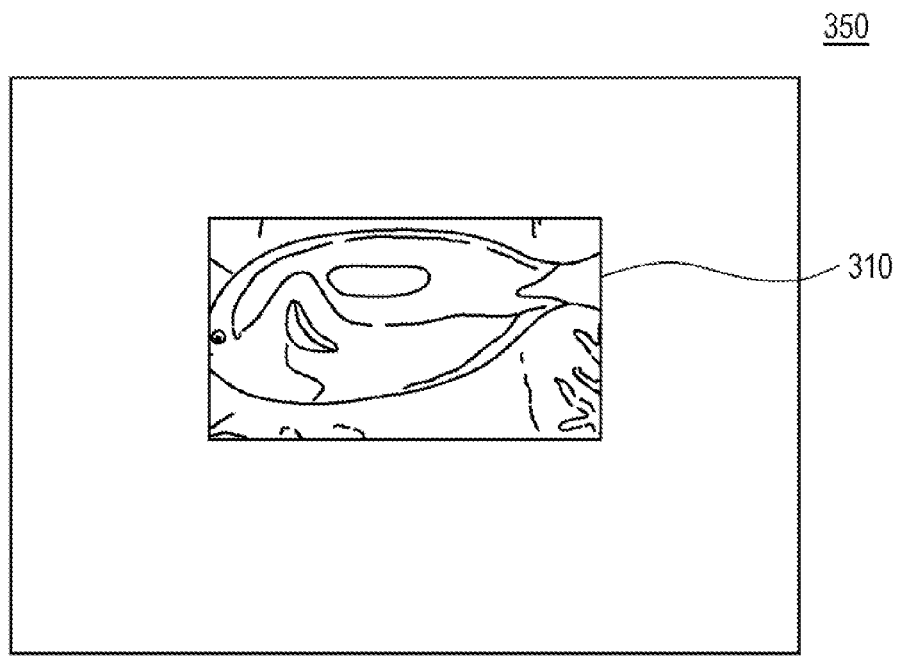
FIG. 3B is an illustration of a the region of interest for an image in accordance with one embodiment of the present invention.

After the sub-blocks have been determined, a texture value may be determined at step 220. The texture value may be associated with the spectral features for sub-blocks of an image and may be computed on at least one of the color bands for each of the sub-blocks. In one embodiment, computing the texture value may include computing a two-dimensional discrete cosine transforms (DCT) on color bands within each sub-block. In one embodiment, a DCT is performed in all three color bands in RGB space (red, green and blue bands). Performing a DCT on all three color bands is better than performing a single DCT on a single luminance band because the color information usually helps to make objects more salient. For example, image 300 of FIG. 3A illustrates a blue fish 310 in a coral environment. Using a luminance DCT, the fish may not stand out from the other elements in the image although it is clearly the focus of the picture. Using a DCT on the three color bands of the image, the fish is selected as the focus of a region of interest 360 within image space 350 in FIG. 3B.

The two dimensional DCT is defined by:

$$F[u,v] = C[u]C[v]\sqrt{\frac{2}{M}}\sqrt{\frac{2}{N}} \sum_{m=0}^{M-1}\sum_{n=0}^{N-1} f[m,n]\cos\left(\frac{(2m+1)u\pi}{2M}\right)\cos\left(\frac{(2n+1)v\pi}{2N}\right) \quad (1)$$

for u=0, 1, 2, ... M−1 and v=0, 1, 2, ..., N−1.

$$C[k] = \begin{cases} 1/\sqrt{2} & \text{for } k = 0 \\ 1 & \text{else} \end{cases}$$

In addition, for each color band, f[m, n] is the color value at the pixel [m, n].

After the two dimensional DCT has been determined for each color band, an information content value is determined for each block at step 230. In one embodiment, for each three-banded DCT block, $$B = \{(r_{u,v}, g_{u,v}, b_{u,v})\},$$

the information content value $\sigma(B)$ is defined as the $L^2$-norm over the Euclidean distance of the RGB values, minus the DC value at (0,0):

$$\sigma(B) = \Sigma\sqrt{r_{u,v}^2 + g_{u,v}^2 + b_{u,v}^2},$$

where the sum is over all $(u,v) \neq (0,0)$. After the an information content value has been determined for each block in an image, operation of method 200 ends at step 235.

Grouping Sub-Blocks

Figure 4:
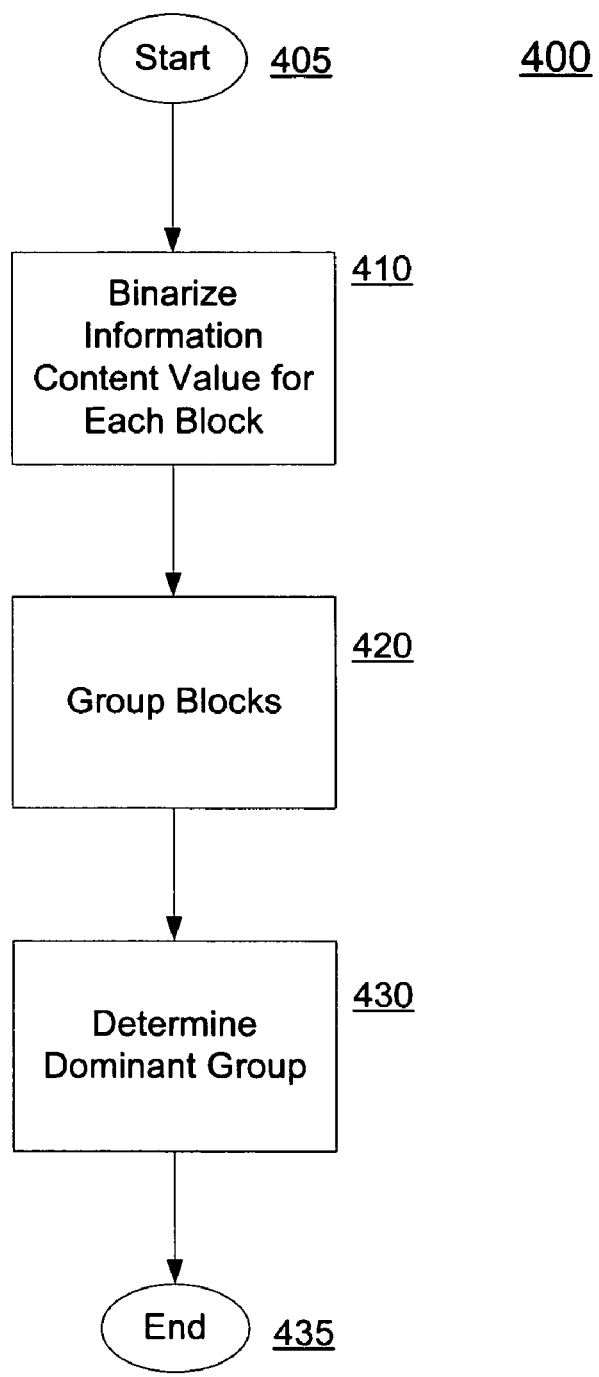
FIG. 4 is an illustration of a method for grouping sub-blocks into regions of interest in accordance with one embodiment of the present invention.
Figure 5:
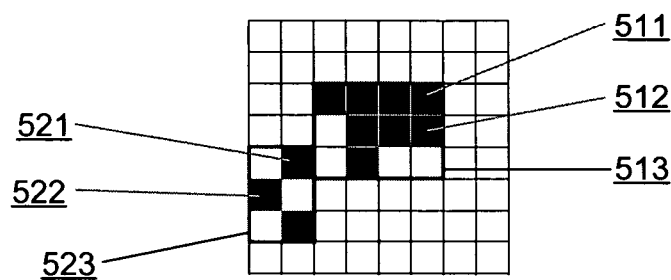
FIG. 5 is an illustration of binarized blocks for an image in accordance with one embodiment of the present invention.

After the sub-blocks have been determined and associated with an information content value, the sub-blocks may be grouped into regions of interest (ROI). One method for grouping sub-blocks is illustrated by method 400 in FIG. 4. Method 400 begins with start step 405. Next, the information content value is binarized for each sub-block at step 410. The information content values are binarized into values of either zero or one. In one embodiment, sub-blocks having a value above one standard deviation are set to one and the remainder of sub-blocks are set to zero. FIG. 5 illustrates the image 310 of FIG. 3A after it was divided into sub-blocks and binarized. The blocks that have been binarized as one are in black, the remainder are white. As illustrated, the blocks binarized to one include block 511, 512, 521 and 522.

After the sub-blocks are binarized, they are grouped together at step 420. Grouping involves forming a "group" of neighboring sub-blocks that have a information content value within a predetermined range. In one embodiment, for each of the blocks to be grouped, the area of that block times a predetermined threshold should not be less than the area of the intersection of the blocks and the density of the combined blocks should not exceed the average density of the plurality of blocks. In one embodiment, the range for binarized sub-blocks is a value of one. A neighboring block is one that shares a side or a corner. The process is continued until no further groupings can be made. In the illustration of FIG. 5, this method produced two groupings in image 500. The groups include a larger group outlined by border 513 and a smaller group outlined by border 523. To improve performance, standard morphology operations of dilation and erosion can be used in conjunction with the grouping. However, the grouping system of the present invention does not require these operations.

After sub-blocks have been grouped together, the dominant group is determined at step 430. In one embodiment, the dominant group is the group within the image having the largest bounding box area. The dominant group is then considered the ROI of the image. Selecting the bounding box as the ROI makes for simpler calculations than selecting a portion of the image corresponding to the actual binarized groups. Smaller bounding boxes usually contain random details, unlike a larger focus of an image that usually corresponds to the largest bounding box. After the dominant group is selected, operation of method 400 ends at step 435.

Figure 6:
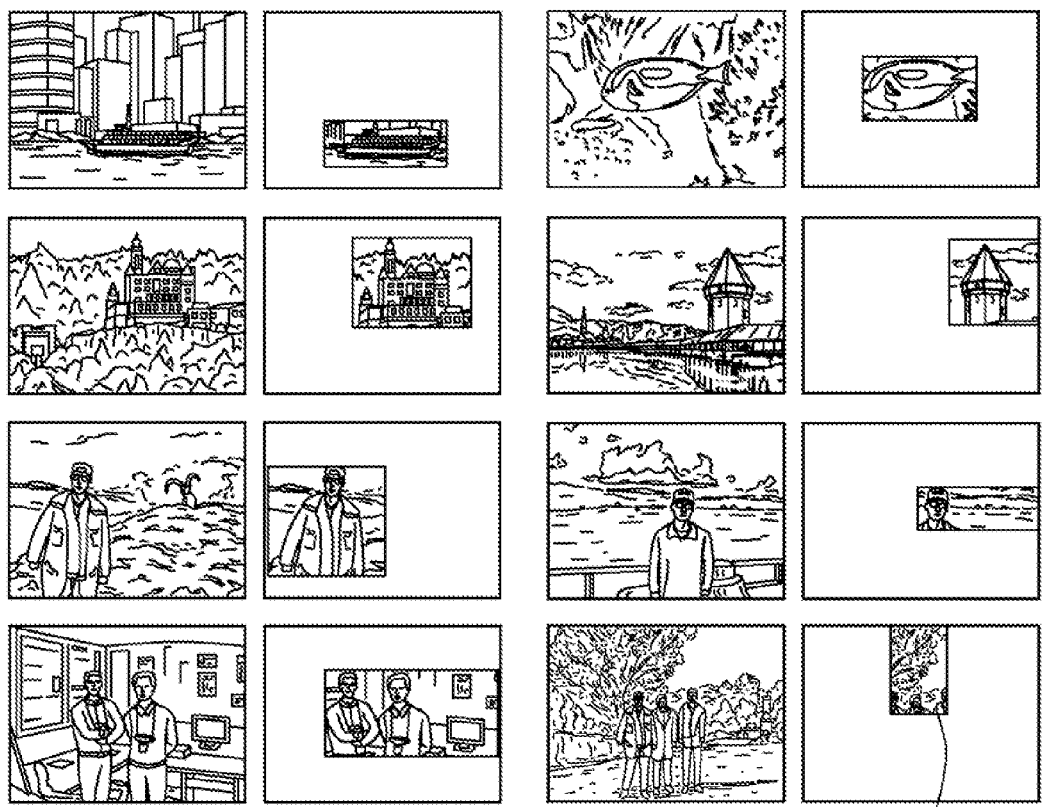
FIG. 6 is an illustration of a series of images and their corresponding dominant region of interest in accordance with one embodiment of the present invention.
Figure 7:
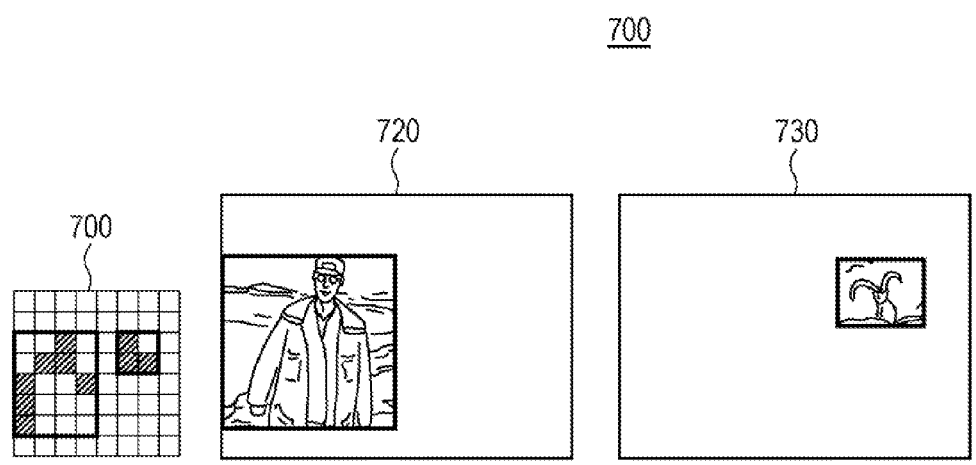
FIG. 7 is an illustration of binarized blocks and the corresponding regions of interest for an image in accordance with one embodiment of the present invention.

In one embodiment, it is possible that more than one "interesting" ROI occurs in an image. For example, in the third image of the first column in FIG. 6, the person and the animal belong to separate ROIs as illustrated in the corresponding sub-block and grouping illustrations of FIG. 7. Unlike the image of the person and the animal, the image having the fish in FIG. 3A includes the non-dominant ROI in bottom left as shown in FIG. 5. The non-dominant ROI in FIG. 5 does not correspond to anything particularly interesting. For applications that include non-dominant ROIs, one manner of resolving whether a non-dominant ROI should be selected is through user intervention. In this embodiment of the present invention, a user may be presented with multiple ROIs and remove the uninteresting ones. For the Stained-Glass collage, this means that all the ROIs would be shown initially, and the user can manually select and remove the bad ones. In other implementations, ROIs meeting a threshold, such as a minimum bounding box size, can be presented to a user for selection or removal.

Center-Weighted Algorithm for Photos

For photos, it is often the case that the ROI is around the center of the image. While there are exceptions, such as photos taken by some professional photographers and artists, the typical user of consumer digital cameras usually puts the objects or people near the middle of the picture and not at the edges. The ROI algorithm of the present invention can take this into account by putting weights on the blocks, with heavier weights near the center of the image. In one embodiment, a bump function or Gaussian function can be used to achieve the weighting.

Figure 8A:
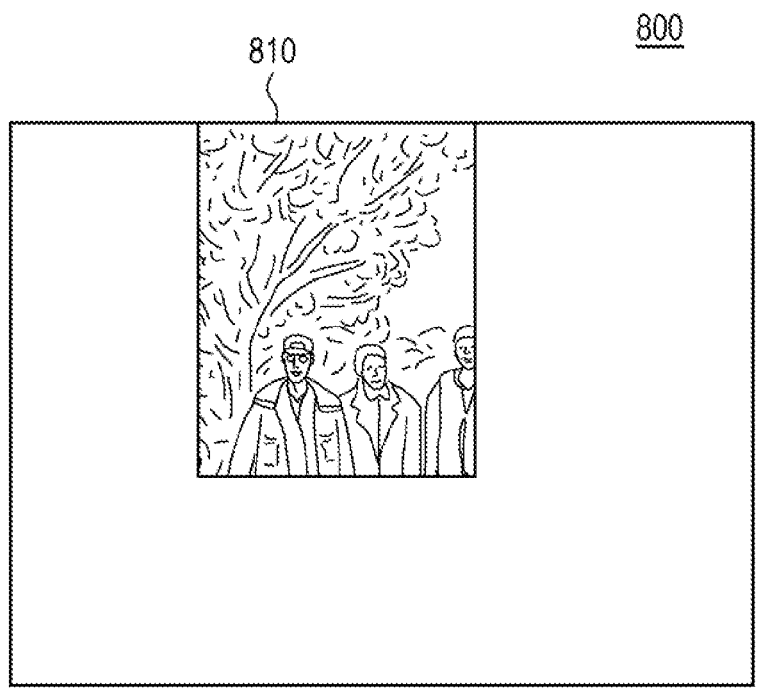
FIG. 8A is an illustration of region of interest in accordance with one embodiment of the present invention.
Figure 8B:
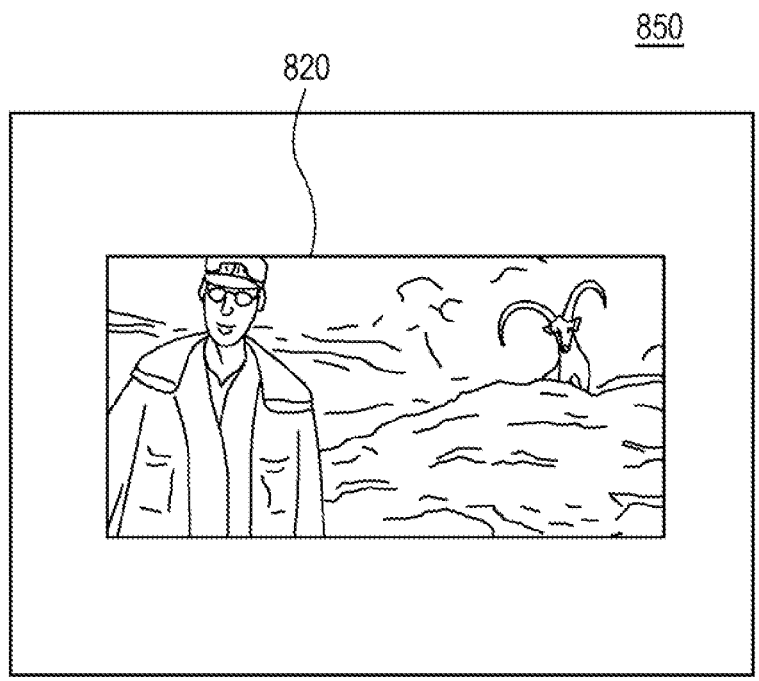
FIG. 8B is an illustration of region of interest in accordance with one embodiment of the present invention.

In one embodiment, a Gaussian function can be used that increases the weight at the center of an image by 50% and tapers off to near zero at the edges of an image. The results for a set of images subject to this embodiment of determining an ROI may have larger ROIs than an embodiment featuring a non-weighted algorithm. For example, the ROI 810 in FIG. 8A is better than the corresponding ROI 620 in FIG. 6, since it shows more of the people. FIG. 8B has one ROI 860 instead of the two ROIs 720 and 730 found in FIG. 7. This can be an advantage if the application shows a single ROI per photo, and a disadvantage if it shows multiple ROIs per photo. For Stained-Glass collage-type applications as disclosed in U.S. patent application Ser. No. 10/815,354, entitled "GENERATING A HIGHLY CONDENSED VISUAL SUMMARY", having smaller ROIs is not a serious problem because the surrounding parts of the ROIs are shown as the result of filling in the gaps between ROIs.

The decision whether to use the center-weighted variation embodiment of the present invention depends on the application domain. For instance, on PDAs and cell phones, the non-weighted variation with smaller ROIs would enable more efficient use of the limited screen space.

Wavelet and other Spectral Decompositions

In addition to using a DCT decomposition as discussed above for determining a texture value, it is possible and within the scope of the present invention to use other spectral decompositions such as wavelet and Haar decompositions in other embodiment of the present invention. For example, wavelets provide a slightly better representation of the image at the cost of longer computation time. It also requires a more complicated algorithm. Thus, for example, for the JPEG 2000 standard which uses wavelet encoding (like DCT in the JPEG format), it is a viable alternative to use a wavelet decomposition to find the sub-blocks of high information content.

Stained Glass Image-Type Displays for Images

Figure 9:
FIG. 9 is an illustration of a collage of photos in accordance with one embodiment of the present invention.

The ROI algorithm of the present invention can be used in Stained-Glass-type visualization as disclosed in U.S. patent application Ser. No. 10/815,354. The basic idea is to find ROIs in a set of images and to condense them into a tightly packed layout. The stained-glass effect comes from non-rectangular region boundaries that emerge from a Voronoi-based algorithm for filling the spaces between the packed regions. For small displays on PDAs and cell phones, the result of the condensation of images is that the people and objects in these regions can be shown larger and become easier to see. For larger displays or printed posters, the Stained-Glass collage provides an aesthetically pleasing way to display photos. As an example, a Stained-Glass collage is shown in FIG. 9 that uses the ROIs from FIG. 6.

Pan-and-Scan for Images

The ROI algorithm of the present invention can also be applied to Pan-and-Scan applications, such as that described in "Automatic Generation of Multimedia Presentation", U.S. patent Publication No. 20040054542, by Foote et al. The Pan-and-Scan technology is a way to present a photo by automatically generating an animation. The animation involving moving across a computed path that intersects the ROIs in the image. The methods described therein include user labeling of regions and using 2D Fourier Transform to determine an interesting direction to pan along the frequency coordinates. Other methods include taking ROIs produced by a face detection module and constructing a path through the faces.

To apply the ROI algorithm of the current invention, several embodiments are addressed. The first is when multiple individual ROIs or "blobs" are identified, as in FIG. 7 where the two ROIs correspond to a person and an animal. In this embodiment, these regions can be provided into the Pan-and-Scan system, substituting them for the output of the disclosed face detection module.

Another embodiment involves the scenario wherein the algorithm finding a single large "blob". This occurs when there are several things close together in a photo (e.g. FIG. 6, $1^{st}$ column, $4^{th}$ photo). It may also be more likely to occur with the center-weighted variation embodiment, which tends to generate a single blob centered in the middle of the photo (e.g. FIG. 8B). In this case, the Pan-and-Scan window can move in from the whole photo to the bounding box of the ROI (this technique is disclosed in U.S. patent Publication No. 20040054542).

Figure 10:
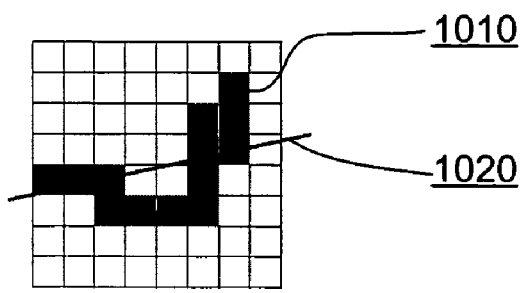
FIG. 10 is an illustration of a region of interest in accordance with one embodiment of the present invention.

Yet another embodiment involves scenic photos with a horizon or skyline. This can be found by the ROI algorithm of the present invention. A ROI is likely to include a horizon if it spans across the width of the photo and if it has low density. For example, using the center-weighted variation on the $2^{nd}$ photo in the $2^{nd}$ column of FIG. 6 produces a ROI that corresponds to its skyline (see FIG. 10). Next, a path for Pan-and-Scan can be constructed. A simple way to do this is to fit a line through the center of the black blocks using linear regression, as shown in FIG. 10.

In one embodiment, the present invention includes an algorithm for finding regions of interest (ROI) in images and photos based on an information driven approach in which sub-blocks of an image are analyzed for information content or compressibility based on the discrete cosine transform. The sub-blocks of low compressibility are grouped into ROIs using a morphological technique. Unlike other algorithms that are geared for highly specific types of ROI (e.g. face detection), the method of the present invention is generally applicable to arbitrary images and photos. A center-weighted variation of the algorithm can produce better results for certain photo applications. The present invention can be used with several other image applications, including Stained-Glass collages and Pan-and-Scan presentations.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, various embodiments of the present invention may be conveniently implemented using a conventional general purpose or a specialized digital computer(s) or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of general purpose or application specific integrated circuits and/or by interconnecting an appropriate network of conventional component circuits, as will be readily apparent to those skilled in the art.

Various embodiments of the present invention include a computer program product which is a storage medium (media) having instructions stored thereon/in which can be used to program a general purpose or specialized computing processor/device to perform any of the features and processes presented herein. The storage medium can include, but is not limited to, one or more of the following: any type of physical media including floppy disks, optical discs, DVD, CD-ROMs, microdrives, halographic storage, magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Various embodiments include a computer program product that can be transmitted over one or more public and/or private networks wherein the transmission includes instructions which can be used to program a computing device to perform any of the features presented herein.

Stored on any one or more of the computer readable medium (media), the present invention includes software for controlling both the hardware of general purpose/specialized computer(s) or processor(s), and for enabling the computer(s) or microprocessor(s) to interact with a human user or other mechanism utilizing the results of the present invention. Such software may include, but is not limited to, device drivers, operating systems, execution environments/containers, user interfaces and applications.

Included in the programming (software) of the general/specialized computer or microprocessor are software modules for implementing the teachings of the present invention, including, but not limited to, determining regions of interest in images.

In one embodiment, if two one-pixel groups are adjacent, they are merged into a larger group, thereby forming a region of high importance, provided that they don't fail one or more stopping conditions. In this embodiment, the stopping conditions keep the groups from spreading too thin. Stopping conditions within the scope of the present invention may be based on energy density, volume, and other characteristics. In one embodiment, the resulting larger group is in the shape of the smallest three dimensional rectangular box that contains both smaller groups of one-pixels. Rectangular shaped groups are discussed herein for example purposes only. Regions may be constructed and grouped in any shape or using many types of formulas.

As discussed above, the stopping conditions may be based on many characteristics. One such characteristic is energy density. In one embodiment of the present invention, the energy density should not be allowed to decrease beyond a certain threshold after a merge. For example, the density of a group A may be represented by d(A), which is the number of 1-pixels in group A divided by the total number of pixels contained in the bounding box of A.

The density of a neighboring group B may similarly represented by d(B). The average density of the whole video segment may be represented by d(W). In this case, the two groups A and B can be merged into group C if d(C)>d(W). Comparing the energy density of the merged group to the average energy density is for exemplary purposes only. Other thresholds for energy density can be used and are intended to be within the scope of the present invention In another embodiment, the volume of a merged group should not expand beyond a certain threshold when two or more groups are merged. For example, the volume of a bounding box for a group A may be represented as v(A). Similarly, the bounding box for a group B may be represented as v(B). For groups A and B, their intersection can be represented as K. In this case, if $v(K)/v(A) < \frac{1}{2}$ and $v(K)/v(B) < \frac{1}{2}$, A and B may not be merged. Comparing the volume of the intersection of two merged groups to each of the groups is for exemplary purposes only. Other volume comparisons can be used and are intended to be within the scope of the present invention.

What is claimed is:

1. An automated method for finding regions of interest in an image comprising:

computing a texture value associated with the spectral features for a plurality of sub-blocks of an image, the texture value computed on at least one of the color bands for each of the sub-blocks;

determining an information value associated with each of the plurality of sub-blocks; and automatically grouping sub-blocks together that have an information value that resides in a predetermined range to form a region of interest, wherein the two neighboring sub-blocks are combined into a new group only if the area of either of the two sub-blocks is greater than a bounding box area of either of the two sub-blocks multiplied by a predetermined non zero threshold.

2. The method of claim 1 wherein grouping sub-blocks includes:

binarizing the information value for each sub-block, wherein a sub-block comprises two or more pixels.

3. The method of claim 2 wherein binarizing includes assigning a value of one to a sub-block with an information value above a standard deviation.

4. The method of claim 1 wherein the grouped neighboring sub-blocks have a density that does not exceed the average density of the plurality of sub-blocks.

5. The method of claim 1 wherein the information value is a binarized value, and the predetermined range includes sub-blocks having an information value of one.

6. The method of claim 1 wherein grouping sub-blocks includes:
   determining a dominant group to be the largest group of sub-blocks.

7. The method of claim 1 wherein a user may select one or more groups of sub-blocks as regions of interest.

8. The method of claim 1 wherein grouping sub-blocks includes:
   weighting the center portion of the image.

9. The method of claim 1 wherein computing a texture value includes:
   computing a discrete cosine transform on a plurality of sub-blocks of an image.

10. The method of claim 1 wherein computing a texture value includes:
    computing a wavelet decomposition on a plurality of sub-blocks of an image.

11. The method of claim 1 wherein computing a texture value includes:
    computing a Haar decomposition on a plurality of sub-blocks of an image.

12. A computer storage medium having instructions stored thereon that when processed by one or more processors cause a system to:
    compute a texture value associated with the spectral features for a plurality of sub-blocks of an image, the texture value computed on at least one of the color bands for each of the sub-blocks;
    determine an information value associated with each of the plurality of sub-blocks; and
    automatically group sub-blocks together that have an information value that resides in a predetermined range, wherein a first group neighboring a second group are combined into a new group when either the first group of sub-blocks or the second group of sub-blocks have an area that when multiplied by a predetermined non zero threshold is not less than the area of the union of the sub-blocks of the first and second groups to form a region of interest.

13. The computer storage medium of claim 12 wherein grouping sub-blocks includes:
    binarizing the information value for each sub-block, wherein a sub-block comprises two or more pixels.

14. The computer storage medium of claim 13 wherein binarizing includes assigning a value of one to a sub-block with an information value above a standard deviation.

15. The computer storage medium of claim 12 wherein the grouped neighboring sub-blocks have a density that does not exceed the average density of the plurality of sub-blocks.

16. The computer storage medium of claim 12 wherein the information value is a binarized value, and the predetermined range includes sub-blocks having an information value of one.

17. The computer storage medium of claim 12 wherein grouping sub-blocks includes:
    determining a dominant group to be the largest group of sub-blocks.

18. The computer storage medium of claim 12 wherein a user may select one or more groups of sub-blocks as regions of interest.

19. The computer storage medium of claim 12 wherein grouping sub-blocks includes:
    weighting the center portion of the image.

20. The computer storage medium of claim 12 wherein computing a texture value includes:
    computing a discrete cosine transform on a plurality of sub-blocks of an image.

21. The computer storage medium of claim 12 wherein computing a texture value includes:
    computing a wavelet decomposition on a plurality of sub-blocks of an image.

22. The computer storage medium of claim 12 wherein computing a texture value includes:
    computing a Haar decomposition on a plurality of sub-blocks of an image.

23. A method for finding regions of interest in an image comprising:
    computing a texture value associated with the spectral features for a plurality of sub-blocks of an image, the texture value computed on at least one of the color bands for each of the sub-blocks;
    determining an information value associated with each of the plurality of sub-blocks; and
    grouping sub-blocks together that have an information value that resides in a predetermined range to form a region of interest, wherein the two neighboring sub-blocks are combined into a new group only if grouped neighboring sub-blocks have a density that does not exceed the average density of the plurality of sub-blocks.

24. The method of claim 23 wherein a sub-block comprises two or more pixels.

25. The method of claim 23 wherein grouping sub-blocks includes:
    grouping neighboring sub-blocks together that have an information value that resides in a predetermined range.

26. The method of claim 6 wherein the largest group of neighboring sub-blocks is the group within the image having largest bounding box area.

* * * * *